United States Patent
Asher et al.

(10) Patent No.: US 7,606,998 B2
(45) Date of Patent: Oct. 20, 2009

(54) STORE INSTRUCTION ORDERING FOR MULTI-CORE PROCESSOR

(75) Inventors: David H. Asher, Sutton, MA (US); Richard E. Kessler, Shrewsbury, MA (US); Yen Lee, San Jose, CA (US)

(73) Assignee: Cavium Networks, Inc., Mountain View, CA (US)

( * ) Notice: Subject to any disclaimer, the term of this patent is extended or adjusted under 35 U.S.C. 154(b) by 174 days.

(21) Appl. No.: 11/002,728

(22) Filed: Nov. 30, 2004

(65) Prior Publication Data

US 2006/0095741 A1    May 4, 2006

Related U.S. Application Data

(60) Provisional application No. 60/609,211, filed on Sep. 10, 2004.

(51) Int. Cl.
*G06F 9/00* (2006.01)
(52) U.S. Cl. ........................... 712/225; 712/220
(58) Field of Classification Search ........... 712/225, 712/220
See application file for complete search history.

(56) References Cited

U.S. PATENT DOCUMENTS

| | | | |
|---|---|---|---|
| 5,265,233 A * | 11/1993 | Frailong et al. ............ 711/118 |
| 5,524,220 A | 6/1996 | Verma et al. |
| 5,990,913 A | 11/1999 | Harriman et al. |
| 6,009,514 A | 12/1999 | Henzinger et al. |
| 6,073,210 A * | 6/2000 | Palanca et al. ............ 711/118 |
| 6,209,073 B1 * | 3/2001 | Okpisz et al. ............ 711/169 |
| 6,286,095 B1 * | 9/2001 | Morris et al. ............ 712/216 |
| 2002/0188817 A1 | 12/2002 | Norden et al. |
| 2003/0033491 A1 | 2/2003 | Henry et al. |
| 2006/0026371 A1 * | 2/2006 | Chrysos et al. ............ 711/158 |

OTHER PUBLICATIONS

Skadron et al.; "Design Issues and Tradeoffs for Write Buffers"; 1997; IEEE.*
Bhandarkar, Dileep P., "Alpha Implementations and Architecture," Section 7.15, (Digital Press), pp. 202-204 (1996).

* cited by examiner

*Primary Examiner*—Alford W Kindred
*Assistant Examiner*—Benjamin P Geib
(74) *Attorney, Agent, or Firm*—Hamilton, Brook, Smith & Reynolds, P.C.

(57) ABSTRACT

A method and apparatus for minimizing stalls in a pipelined processor is provided. Instructions in an out-of-order instruction scheduler are executed in order without stalling the pipeline by sending store data to external memory through an ordering queue.

19 Claims, 7 Drawing Sheets ing no active write buffer entries in the write buffer and at least one ordering queue entry in the ordering queue, the system interface sets a store ordering instruction execution indicator in a last ordering queue entry. Upon detecting no active write buffer entries in the write buffer and no ordering queue entries in the ordering queue, the system interface allocates an ordering queue entry and sets a store ordering instruction execution indicator in the allocated ordering queue entry.

STORE INSTRUCTION ORDERING FOR MULTI-CORE PROCESSOR

RELATED APPLICATIONS

This application claims the benefit of U.S. Provisional Application No. 60/609,211, filed on Sep. 10, 2004. The entire teachings of the above application are incorporated herein by reference.

BACKGROUND OF THE INVENTION

A pipelining technique is typically used in a Reduced Instruction Set Computing (RISC) processor to divide the instruction processing into a series of stages of a pipeline. As instructions flow through the instruction pipeline, each stage performs a different function. More than one instruction may be processed at the same time, with each instruction being processed in a different stage of the pipeline. The instruction advances through the pipeline stages at a clock rate which is determined by the slowest stage in the pipeline. A new instruction can be started every clock cycle in contrast to a non-pipelined processor in which processing of a new instruction cannot commence until processing of the previous instruction is complete. Processor throughput is a function of (i) pipeline stage clock speed; (ii) pipeline utilization or "efficiency" during normal execution: and (iii) the number of pipeline stalls. A superscalar RISC processor further increases throughput by allowing multiple instructions to be issued simultaneously and dispatched in parallel to multiple execution units.

An instruction pipeline often stalls due to resource constraints and inter-instruction data dependencies. An inter-instruction data dependency results in a stall when a later issued instruction requires a result produced by an earlier instruction that has not yet completed. The later issued instruction is thus stalled in the pipeline until the result of the first instruction is available. Stalls can also occur due to inadequate buffering of store data. Store ordering can be complicated in multi-core cache coherent memory chips/systems because coherent memory buses may be highly-pipelined and may separate address, data, and commit operations.

SUMMARY OF THE INVENTION

A system and method for ordering store instructions implemented in a processor minimizes instruction pipeline stalls according to the principles of the present invention.

A processor includes a write buffer having a plurality of write buffer entries for storing data to be stored in external memory and a system interface. The system interface includes an ordering queue and ordering queue logic. Data stored in the write buffer is sent to external memory via an ordering queue entry in the ordering queue. Upon detecting execution of a store ordering instruction, the ordering queue logic ensures that a write buffer address identified by ordering queue entries in the ordering queue is sent to external memory prior to an address for a subsequently issued store instruction. The ordering queue logic ensures that the write buffer addresses are sent by monitoring a commit indicator returned from external memory for each write buffer address.

When a store ordering instruction is executed, there may be active write buffer entries in the write buffer and ordering queue entries in the ordering queue. Upon detecting active write buffer entries in the write buffer, the system interface allocates an ordering queue entry and identifies the active write buffer entries in the ordering queue entry. Upon detect- The write buffer has N write buffer entries and the ordering queue has N+1 ordering queue entries. As the number of entries in the ordering queue is greater than the number of entries in the write buffer, an ordering queue entry is available when an ordering instruction is executed and therefore stalling of a store ordering instruction can be eliminated. In one embodiment, N is 16. The write buffer entry may include a buffer for storing data to be stored in external memory and a mask having a bit corresponding to each byte in the buffer. The ordering queue entry may include a store ordering instruction execution indicator and an ordering mask having a bit corresponding to each write buffer entry.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
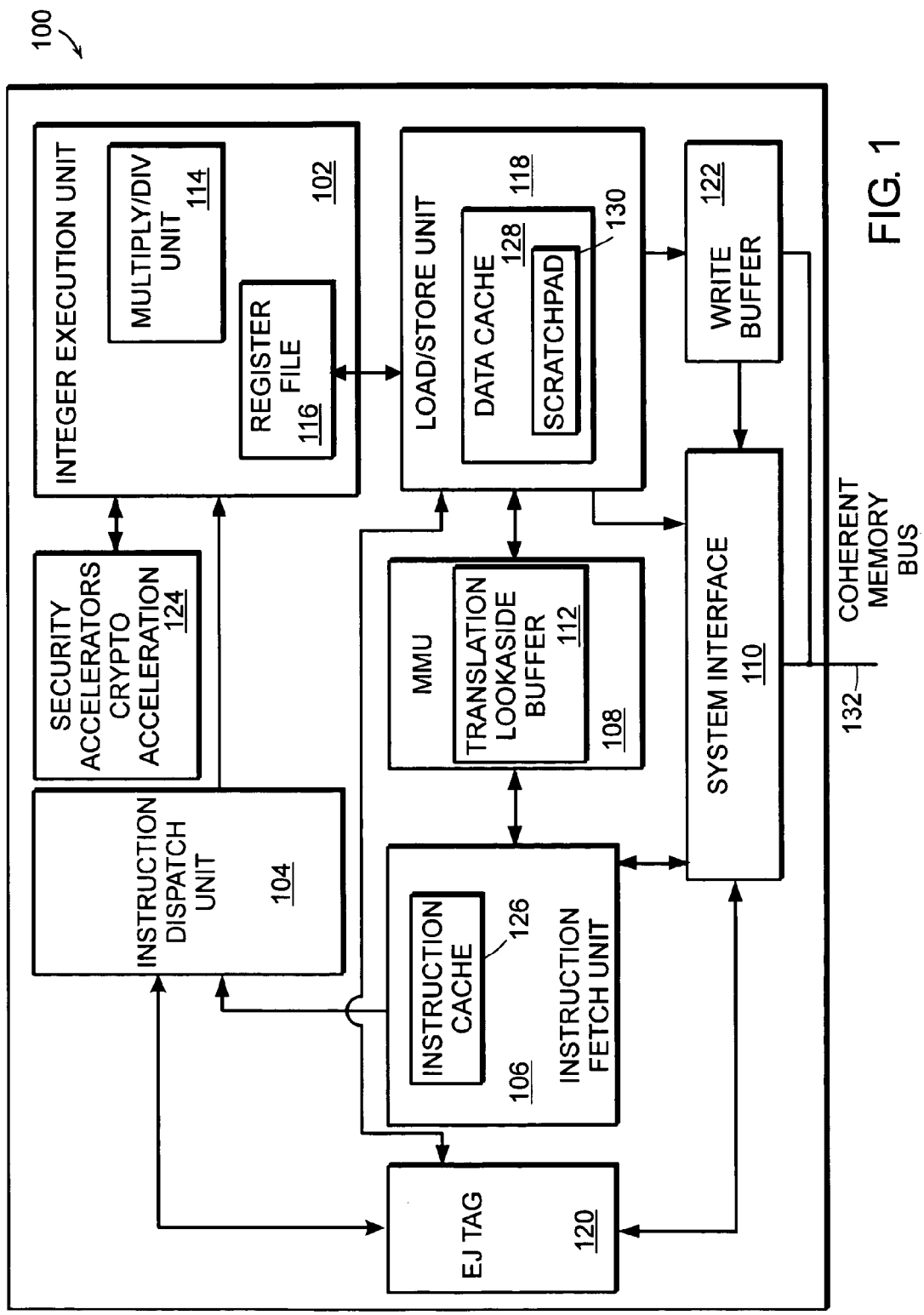
FIG. 1 is a block diagram of a Reduced Instruction Set Computing (RISC) processor having an instruction set that includes a memory ordering instruction for ordering store instructions according to the principles of the present invention.

A processor is a central processing unit (CPU) that interprets and executes instructions. FIG. 1 is a block diagram of a Reduced Instruction Set Computing (RISC) processor 100 having an instruction set that includes an instruction for ordering store instructions according to the principles of the present invention.

The processor 100 includes an Execution Unit 102, an Instruction dispatch unit 104, an instruction fetch unit 106, a load/store unit 118, a Memory Management Unit (MMU) 108, a system interface 110, a write buffer 122 and security accelerators 124. The processor core also includes an EJTAG interface 120 allowing debug operations to be performed. The system interface 110 controls access to external memory, that is, memory external to the processor such as, level 2 (L2) cache memory.

The Execution unit 102 includes a multiply unit 114 and at least one register file 116. The multiply unit 114 has a 64-bit register-direct multiply. The Instruction fetch unit 106 includes instruction cache (ICache) 126. The load/store unit 118 includes data cache 128. A portion of the data cache 240 can be reserved as local scratch pad/local memory 130. In one embodiment the instruction cache 126 is 32K bytes, the data cache 128 is 8K bytes and the write buffer 122 is 2K bytes. The Memory Management Unit 108 includes a Translation Lookaside Buffer (TLB) 112.

In one embodiment, the processor 100 includes a crypto acceleration module (security accelerators) 124 that include cryptography acceleration for Triple Data Encryption standard (3DES), Advanced Encryption Standard (AES), Secure Hash Algorithm (SHA-1), Message Digest Algorithm #5 (MD5). The crypto acceleration module 124 communicates by moves to and from the main register file 116 in the Execution unit 102. RSA and the Diffie-Hellman (DH) algorithm are performed in the multiplier unit 114.

A superscalar processor has a superscalar instruction pipeline that allows more than one instruction to be completed each clock cycle by allowing multiple instructions to be issued simultaneously and dispatched in parallel to multiple execution units. The RISC-type processor 100 has an instruction set architecture that defines instructions by which the programmer interfaces with the RISC-type processor. Only load and store instructions access external memory; that is memory external to the processor 100. In one embodiment, the external memory is accessed over a coherent memory bus 134. All other instructions operate on data stored in the register file 116 in the processor 100. In one embodiment, the processor is a superscalar dual issue processor.

The instruction pipeline is divided into stages, each stage taking one clock cycle to complete. Thus, in a five stage pipeline, it takes five clock cycles to process each instruction and five instructions can be processed concurrently with each instruction being processed by a different stage of the pipeline in any given clock cycle. Typically, a five stage pipeline includes the following stages: fetch, decode, execute, memory and write back.

During the fetch-stage, the instruction fetch unit 106 fetches an instruction from instruction cache 126 at a location in instruction cache 128 identified by a memory address stored in a program counter. During the decode-stage, the instruction fetched in the fetch-stage is decoded by the instruction dispatch unit 104 and the address of the next instruction to be fetched for the issuing context is computed. During the execute-stage, the Integer Execution unit 102 performs an operation dependent on the type of instruction. For example, the Integer Execution Unit 102 begins the arithmetic or logical operation for a register-to-register instruction, calculates the virtual address for a load or store operation or determines whether the branch condition is true for a branch instruction. During the memory-stage, data is aligned by the load/store unit 118 and transferred to its destination in external memory. During the write back-stage, the result of a register-to-register or load instruction is written back to the register file 116.

The system interface 110 is coupled via the Coherent Memory Bus to external memory. In one embodiment, the Coherent Memory bus has 384 bits and includes four separate buses: an Address/Command Bus, a Store Data Bus, a Commit/Response control bus and a Fill Data bus. All store data is sent to external memory over the coherent memory bus 132 via a write buffer entry in the write buffer. In one embodiment, the write buffer has 16 write buffer entries.

Store data flows from the load/store unit 118 to the write buffer 122, and from the write buffer 122 through the system interface 110 to external memory. The processor 100 can generate data to be stored in external memory faster than the system interface 110 can write the store data to the external memory. The write buffer 122 minimizes pipeline stalls by providing a resource for storing data prior to forwarding the data to external memory.

The write buffer 122 is also used to aggregate data to be stored in external memory over a coherent memory bus 132 into aligned cache blocks to maximize the rate at which the data can be written to the external memory. Furthermore, the write buffer can also merge multiple stores to the same location in external memory resulting in a single write operation to external memory. The write-merging operation of the write buffer 122 can result in the order of writes to the external memory being different than the order of execution of the store instructions.

In normal operation, the order in which load and store memory accesses appear to a viewer outside the processor 100 is not specified by the architecture. The instruction set includes an instruction for ordering store instructions which is referred to herein as the SYNCW instruction. The SYNCW instruction forces all prior issued store instructions to appear visible outside the processor 100 before any subsequent store instructions are visible. For example, the instruction sequence

ST DATA
SYNCW
ST FLAG
SYNCW includes two SYNCW instructions. The SYNCW instructions guarantee the order of the data store instructions (ST DATA) and store flag (ST FLAG) instructions, that is, the SYNCW instruction after the ST DATA instruction guarantees that the store data for the ST DATA instruction is visible outside the processor; that is, sent on the coherent memory bus 132 before the ST FLAG instruction. The SYNCW instruction after the ST FLAG instruction guarantees that ST FLAG is visible outside the processor before the data for any subsequent store is visible outside the processor.

This type of synchronization may commonly be needed to guarantee that a data buffer in external memory is updated before a FLAG variable is, and to force a FLAG variable update to become visible as soon as possible, before the data from any subsequent store instruction is visible.

Figure 2:
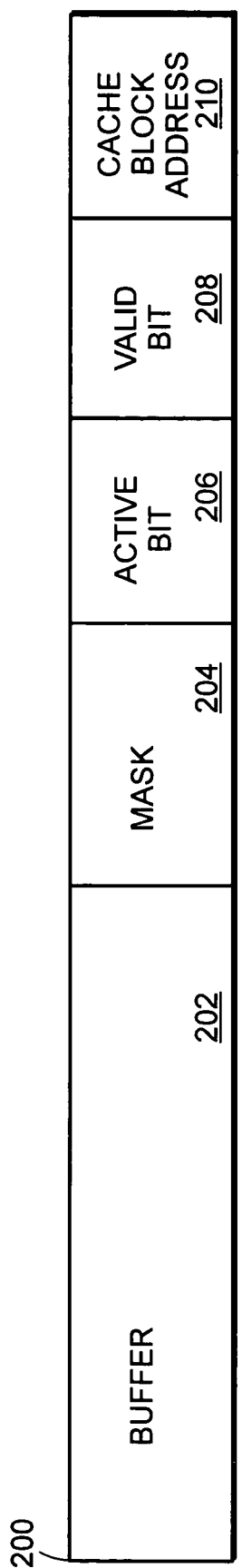
FIG. 2 illustrates a write buffer entry in the write buffer shown in FIG. 1.

FIG. 2 illustrates a write buffer entry 200 in the write buffer 122 shown in FIG. 1. The write buffer entry 200 includes a buffer 202 for storing a contiguous block of data to be stored in external memory. The write buffer entry 200 also includes a mask field 204 having one bit corresponding to each byte in the buffer 202. The state of each bit in the bit mask 204 indicates whether the corresponding byte in the buffer 202 is storing data to be written to external memory. The cache block address field 210 in the write buffer entry stores the start address in external memory of the 128 byte cache block stored in the buffer 202. The write buffer entry 200 also includes an active bit 206 and a valid bit 208. The valid bit 208 is set when the buffer 202 is storing data to be written to external memory and is cleared after the data stored in the buffer 202 has been written to external memory. In one embodiment, the buffer can store a 128 byte contiguous block of data and the mask has 128 bits, one bit corresponding to each byte in the buffer.

The write buffer 122 is a merging write buffer, that is, separate store instructions that store data in the cache block identified by the address stored in the cache block address 210 in a write buffer entry 200 can be collapsed into a single write operation to external memory.

The state of the active bit 206 indicates whether data from a subsequently executed store instruction can be merged into the write buffer entry 200 or whether the data stored in the buffer 202 in the write buffer entry 200 is in the process of being written to the external memory. The mask 204 and the buffer 202 in the write buffer entry are updated accordingly when the data from a store instruction is merged into an existing write buffer entry 200.

Data to be stored in external memory for a store instruction either joins or merges into an active write buffer entry or a new write buffer entry is allocated dependent on the address in external memory to which the data is to be stored. The address in the store instruction is compared against the address stored in the cache block address field 210 in all currently active write buffer entries 200. If the data to be stored can be merged into a cache block that is already stored in a buffer 202 in an active write buffer entry 200, the buffer 202 and the mask field 204 are updated accordingly.

If a merge with an active write buffer entry is not possible, a write buffer entry is allocated from a pool of invalid write buffer entries (write buffer entries with valid bit cleared). After allocation, the active bit 206 in the write buffer entry 200 is set. For example, if the cache block address stored in a write buffer entry is 0x1000, a byte to be stored at address 0x1010 is located in the 128 byte cache block starting at 0x1000 and can be stored in the write buffer entry storage area; that is, the store data is joined to the write buffer entry. A subsequent store instruction to address 0x1000 in the cache block overwrites the data already stored in the cache block in the write buffer entry, that is, merges into the active write buffer entry.

The result of a store instruction (stored value) to be written to external memory can reside in a write buffer entry 200 in the write buffer for some time before the processor 100 writes the result to external memory.

Figure 3:
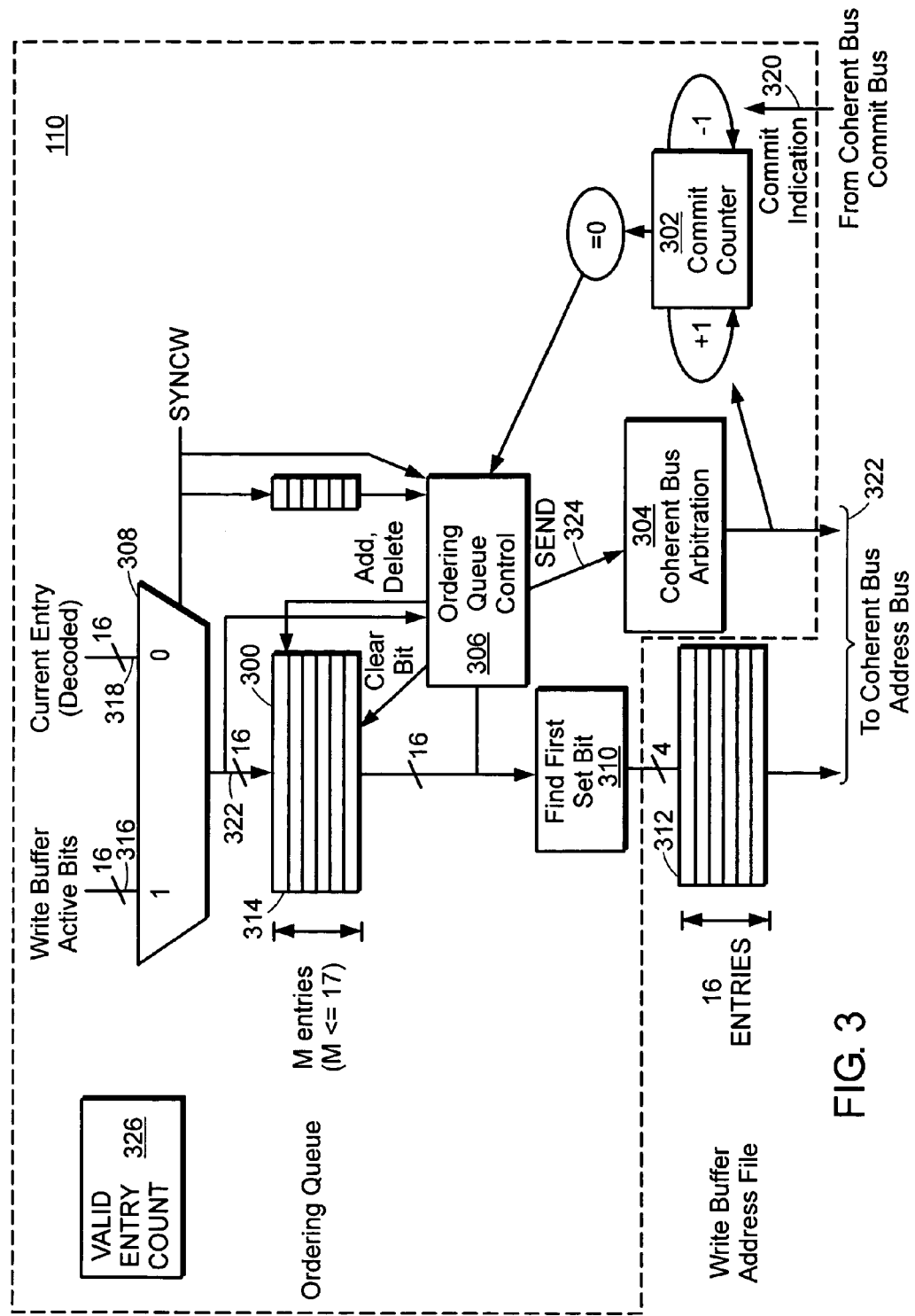
FIG. 3 is a block diagram of control logic in the system interface in the processor core for sending data stored in write buffer entries over the coherent memory bus to external memory.

FIG. 3 is a block diagram of control logic in the system interface 110 in the processor core for sending data stored in write buffer entries 200 over the coherent memory bus 132 to external memory. The write buffer address file 312 that is part of the write buffer 122 is also shown in FIG. 3.

All data stored in write buffer entries 200 in the write buffer 122 is sent to external memory via an entry 314 in an ordering queue 300. The ordering queue is implemented as a First In First Out (FIFO) queue. An ordering queue entry 314 in the ordering queue 300 is allocated each time the active bit 206 in a write buffer entry 200 is cleared, indicating that the data stored in the buffer 202 in the write buffer entry 200 is to be written to external memory. For example, the active bit 206 in a write buffer entry 200 can be cleared when a pre-selected number of CPU cycles have elapsed since the last write of store data to external memory or after execution of a SYNCW instruction. Each ordering queue entry 314 identifies one or more write buffer entries 200 storing data to be written to external memory. A count field 326 stores a count of the number of ordering queue entries.

Figure 4:
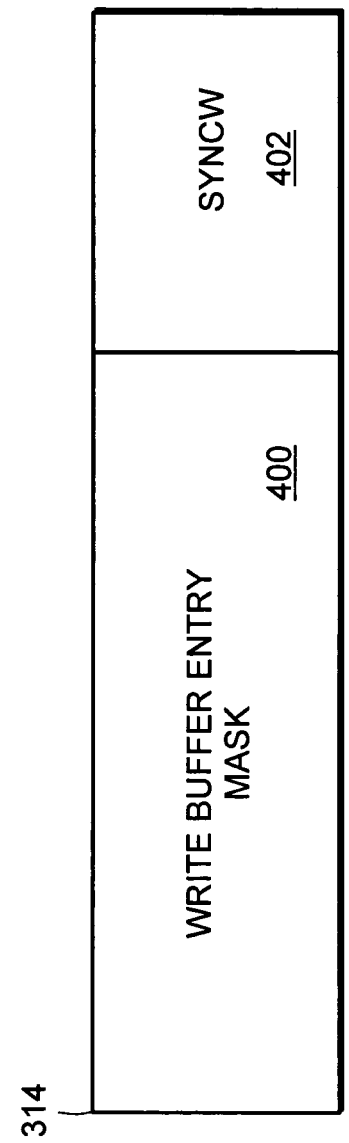
FIG. 4 is a block diagram of one of the ordering queue entries in the ordering queue shown in FIG. 2.

FIG. 4 is a block diagram of one of the ordering queue entries 314 in the ordering queue 300 shown in FIG. 2. The ordering queue entry 314 includes a write buffer entry mask 400 and a SYNCW field 402. The write buffer entry mask 400 includes a bit corresponding to each write buffer entry 200 in the write buffer 122. The state of each bit in the write buffer entry mask 400 indicates whether the corresponding write buffer entry 200 in the write buffer 122 is to be written to external memory for the ordering queue entry 314. The SYNCW field 402 is a single bit, the state of which indicates whether a SYNCW instruction has been executed.

The processor 100 sends all write buffer entries 200 identified by the write buffer entry mask 400 in a first ordering queue entry 314 to external memory before it deletes the first ordering queue entry and before it sends any write buffer entries 200 identified by the write buffer entry mask 400 in the next ordering queue entry. For example, in one embodiment, there are N write buffer entries 200, and each ordering queue entry 314 in the ordering queue 300 has an N-bit write buffer entry mask (vector) 400 that identifies write buffer entries. There are M=N+1 ordering queue entries 314 in the ordering queue 300, so that the ordering queue 300 does not overflow and execution of a SYNCW instruction is never stalled. In an alternate embodiment, the number of ordering queue entries 314 in the ordering queue 300 may be fewer, in this case, the execution of a SYNCW instruction may stall if the ordering queue 300 is full.

Returning to FIG. 3, write buffer entries 200 storing data to be written to external memory are added to the ordering queue 300 through multiplexer 308 and ordering queue control logic 306. The system interface 110 also includes coherent bus arbitration logic 304 and a commit counter 302 that control the transfer of store data to external memory via the coherent memory bus. The commit counter 302 keeps track of completion of store operations to external memory. When the commit counter is zero, all prior stores are visible in the system.

As discussed in conjunction with FIG. 4, each ordering queue entry 314 includes a mask field 400 and a SYNCW bit 402. In the embodiment shown, there are 16 write buffer entries (N=16) and 17 ordering queue entries (M=N+1). The multiplexer 308 selects either the 16 write buffer active bits 316 (with one active bit 206 from each write buffer entry 200) or a 16-bit vector with only one bit corresponding to a single entry 318. The selected 16 active bits 322 are forwarded to ordering queue control logic 306 and stored in an ordering queue entry 314 in the ordering queue 300. The ordering queue control logic 306 through add/delete control signals adds and deletes ordering queue entries in the ordering queue. For example, the ordering queue can be implemented as a collapsing First In First Out (FIFO), with new entries added to one end of the queue and entries processed from the other end (head) of the queue.

An ordering queue entry 314 with only one write buffer entry can be created for many different conditions as is well-known to those skilled in the art, for example, for a write buffer overflow condition or a timeout condition. The conditions for creating an ordering queue entry with only one write buffer entry are beyond the scope of the present invention.

The SYNCW bit 402 in each ordering queue entry is shown separated from the other fields in each ordering queue entry 314 in the ordering queue 300. The SYNCW bit 402 in each ordering queue entry 314 is also forwarded to ordering queue control logic 306.

When the SYNCW bit is set in the ordering queue entry 314 at the head of the ordering queue 300, the ordering queue logic ensures that write buffer addresses identified by ordering queue entries in the ordering queue are sent to external memory prior to addresses for a subsequently issued store instruction, and that these addresses are committed before any subsequent addresses are sent. The ordering queue control logic 306 issues a send request 324 to the coherent bus arbitration logic 304 to send the cache block address stored in the buffer 202 in the next write buffer entry 200 identified by the mask bits 400 in the ordering queue entry 314 to the coherent bus arbitration logic 304. The coherent bus arbitration logic 304 issues the request on the coherent bus address bus to external memory.

In one embodiment, the write buffer entry mask bits 400 in the current ordering queue entry 314 are also forwarded to the find first set bit logic 312 to select the cache block address stored in the write buffer entry 204 that is currently being processed. The cache block address stored in the cache block address field 210 in the write buffer entry 200 corresponding to the first set bit in the mask 400 in the ordering queue entry 314 is selected in the write buffer address file 312 and forwarded on the coherent bus address bus 322.

After the cache block address in the first write buffer entry 204 has been forwarded to external memory over the coherent memory bus, the ordering queue control logic 306 clears the bit in the write buffer entry mask 104 corresponding to the write buffer entry 204 in the current ordering queue entry 314.

All write buffer addresses 200 identified by the write buffer entry mask bits 400 in the ordering queue entry 314 are sent to external memory over the coherent memory bus prior to deleting the ordering queue entry 314 and processing the write buffer entries 204 in the next ordering queue entry 314. An ordering queue entry can be deleted after all mask bits are sent and either: a) the SYNCW bit is clear, or b) the commit count is zero. After the data stored in the write buffer entry 200 has been written to external memory, the valid bit 208 is cleared, indicating that the write buffer entry 200 is free and available for allocation.

The execution of the SYNCW instruction results in ordering of store instructions by forcing all stores in active write buffer entries to complete; that is, the store data is committed to external memory before any subsequent store addresses are sent to the external memory. If no SYNCW instructions have been executed, the SYNCW bit in each ordering queue entry is clear.

Some memory ordering instruction implementations can stall instruction execution due to the lack of completion of prior store instructions or inadequate buffering in the write buffer. In the present invention, the execution of a memory ordering instruction need not be stalled (if M=N+1) because prior buffered stores (and the SYNCW) can always enter a unique ordering queue; that is, an ordering queue entry 314 allocated in the ordering queue 300.

SYNCW is asserted whenever a SYNCW instruction executes, and a new ordering queue entry is created. When a new ordering queue entry is not created, the SYNCW bit in the newest existing ordering queue entry may need to be set to guarantee the order of prior stores relative to subsequent stores. A combination of the execution unit 102 and the load/store unit 118 detects execution of a SYNCW instruction and asserts SYNCW.

The execution of a SYNCW instruction results in setting the SYNCW bit 402 in ordering queue entries 314. When the SYNCW bit 402 is set in an ordering queue entry, the ordering queue entry is not deleted until all of the following conditions are satisfied: (1) All addresses of the write buffer entries 200 included in the ordering queue entry (identified by the write buffer entry mask 400) have been sent to the external memory; and (2) All addresses sent to the system by this or other ordering queue entries are visible; that is, the commit counter 302 is zero.

Figure 5:
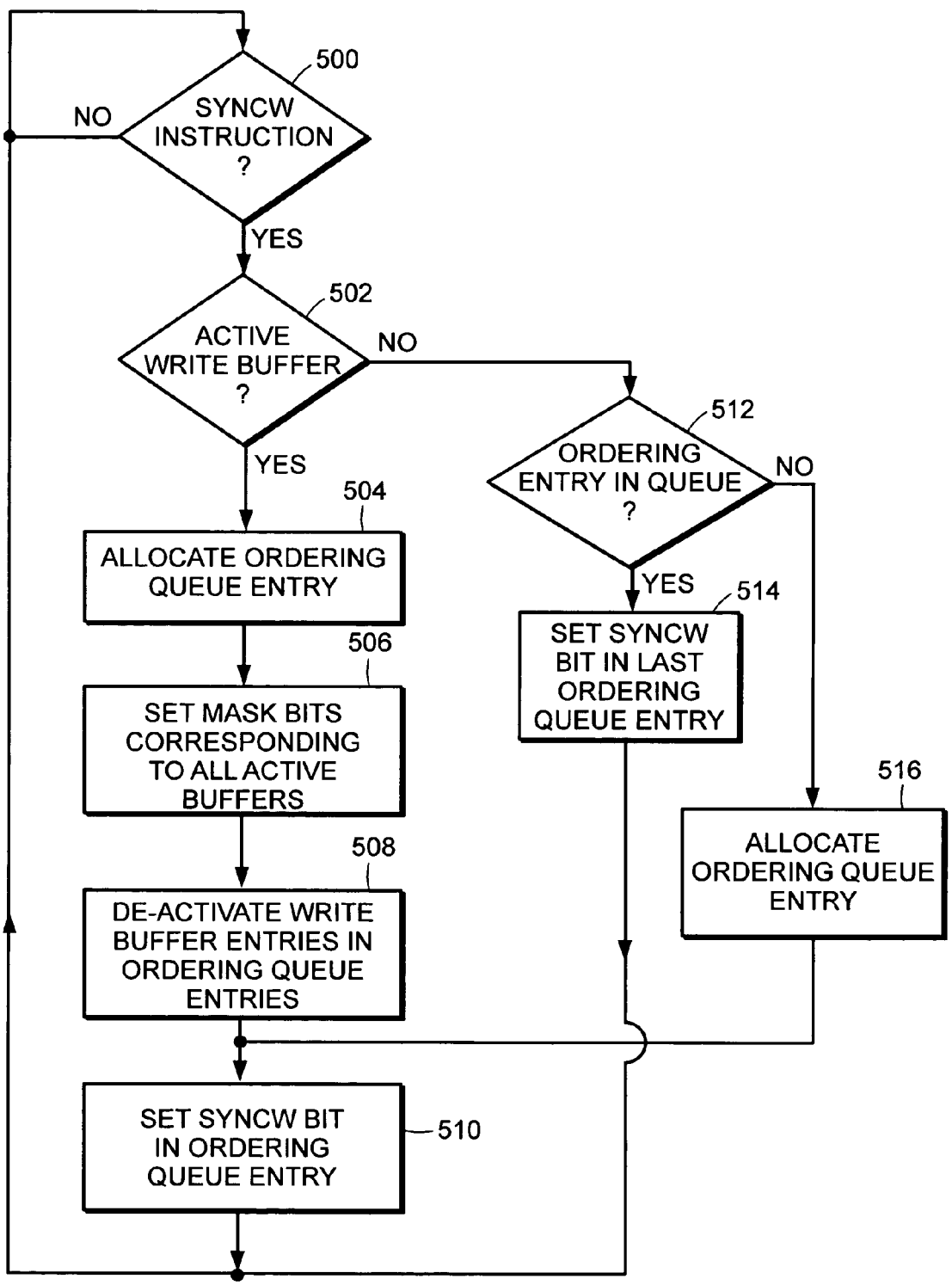
FIG. 5 is a flow chart illustrating a method implemented in the ordering queue control logic for ordering store instructions after execution of a SYNCW instruction.

FIG. 5 is a flow chart illustrating a method implemented in the ordering queue control logic 306 for ordering store instructions after execution of a SYNCW instruction. The flow chart is described in conjunction with FIG. 3.

At step 500, the write buffer control logic 306 monitors execution of a SYNCW instruction. If a SYNCW instruction execution is detected, processing continues with step 502.

At step 502, the write buffer control logic 306 checks if there are any active write buffer entries; that is, write buffer entries in the write buffer with the active bit 206 set. If so, processing continues with step 504. If not, processing continues with step 512.

At step 504, there are active write buffer entries in the write buffer. Processing continues with step 504.

At step 504, an ordering queue entry 314 is allocated in the ordering queue 300. Processing continues with step 506.

At step 506, the write buffer entry mask bits 400 in the allocated ordering queue entry 312 corresponding to all active write buffer entries 200 in the write buffer 122 are set. Processing continues with step 508.

At step 508, the write buffer entries included in the allocated ordering queue entry 314 are deactivated by clearing the active bit 208 in each write buffer entry 200. The valid bit 208 in each write buffer entry 200 remains set until the data stored in the buffer 202 in the write buffer entry 200 has been written to external memory.

At step 510, the SYNCW bit 402 is set in the allocated ordering queue entry 200. Processing continues with step 500 to wait for the next SYNCW instruction to be executed.

At step 512, there are no active write buffer entries 200 in the write buffer 122, the write buffer control logic 306 checks if there are ordering queue entries 314 in the ordering queue 300. If so, processing continues with step 514. If not, processing continues with step 516.

At step 514, there are no active write buffer entries 200 in the write buffer 122, and there is at least one ordering queue entry 314 in the ordering queue 300. No ordering queue entry is allocated, instead, the SYNCW bit 402 in the last ordering queue entry 314 that was allocated in the ordering queue 300. Processing continues with step 500 to wait for the next SYNCW instruction to be executed.

At step 516, there are no active write buffer entries 200 in the write buffer 122, and there are no ordering queue entries 314 in the ordering queue 300. An ordering queue entry 314 is allocated. No write buffer entry mask bits 400 are set because there are no active write buffers 200 having data to be stored in external memory. Processing continues with step 510 to set the SYNCW bit 402 in the allocated ordering queue entry.

Figure 6:
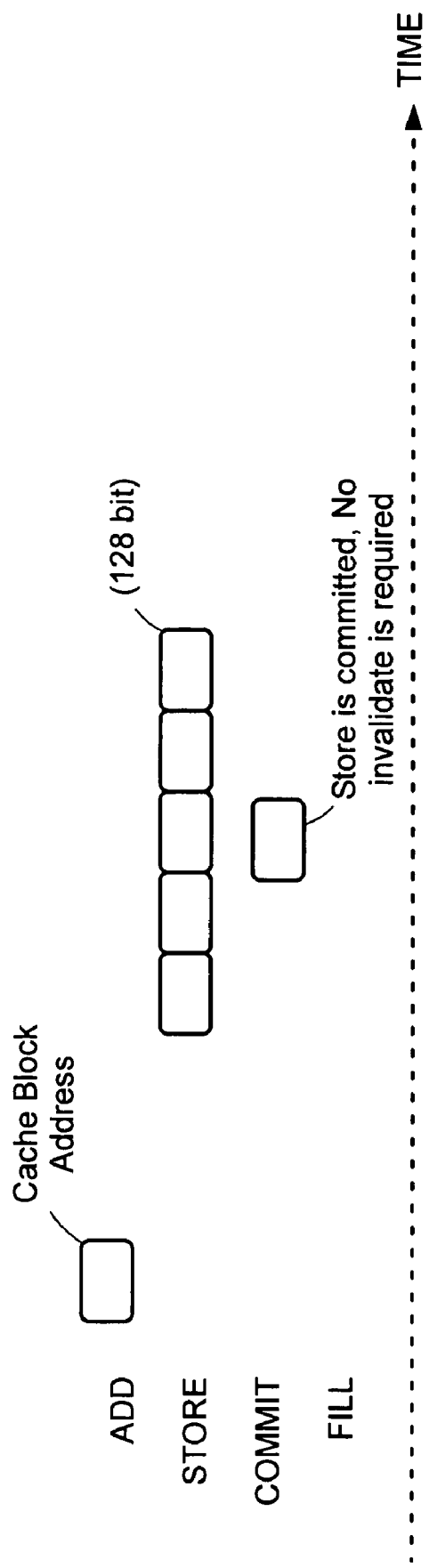
FIG. 6 illustrates a store operation on the coherent memory bus shown in FIG. 5.

FIG. 6 illustrates a store operation on the coherent memory bus 132 shown in FIG. 1. The coherent memory bus includes an ADD bus, a STORE bus, a COMMIT bus and a FILL bus. The interface to the ADD bus and the COMMIT bus are shown in FIG. 3. The ADD bus transfers an address and control information to initiate a coherent memory bus transaction. The STORE bus transfers the store data associated with the transaction. The COMMIT bus transfers control information that initiates transaction responses from the external memory. The FILL bus transfers cache blocks from the external memory to the processor.

The coherent bus arbitration logic 304 controls the store operation. A store operation is initiated upon receiving a send request 324 from the ordering queue control logic 306. The address of a cache block 800 that is stored in a write buffer entry 200 is sent from the write buffer address file 312 on the ADD bus and the commit counter 302 is incremented. The ADD bus cycle also sends the number of 128 bit (octaword) transfers required during the STORE bus cycle.

The STORE bus transfers are scheduled later, when the STORE bus is available and buffer space is available in external memory for the data. The processor drives the store data into the STORE bus. In the example shown, five STORE bus cycles are required for the complete store with 16 bytes (128 bits) transferred in each STORE bus cycle. The number of STORE bus cycles can range from as small as one, up to eight to transfer the entire 128 byte cache block stored in a buffer 202 in a write buffer entry 200. An external memory controller buffers the ADD and STORE bus information and services the write operation to the external memory. A commit indication 320 received over the COMMIT bus indicates that a memory controller has received and ordered the address; that is, that the address has been sent to external memory.

The commit counter 302 is decremented after the commit indication 320 is received over the COMMIT bus. The commit indication 320 indicates that the store data is visible to all users of the Coherent Memory Bus 132. The commit indication 320 may be sent before the actual store operation is completely retired. For example, the external memory controller can send the commit indication 320 on the commit bus to the processor for the store operation even though the data is not yet written in the external memory, provided that any subsequent Coherent Memory Bus operation will see the updated store information.

Ordering queue control logic 306 can request that the coherent bus arbitration logic start another store cycle on the coherent memory bus upon detecting that the commit counter is equal to 0; that is, that the previous store cycle has completed.

Memory ordering instructions are necessary in many high-performance memory systems, because instructions are serviced out of order. In particular, the high-performance memory ordering instructions are important for high packet-processing performance because many operations can be kept in-flight by packet-processing applications.

Figure 7:
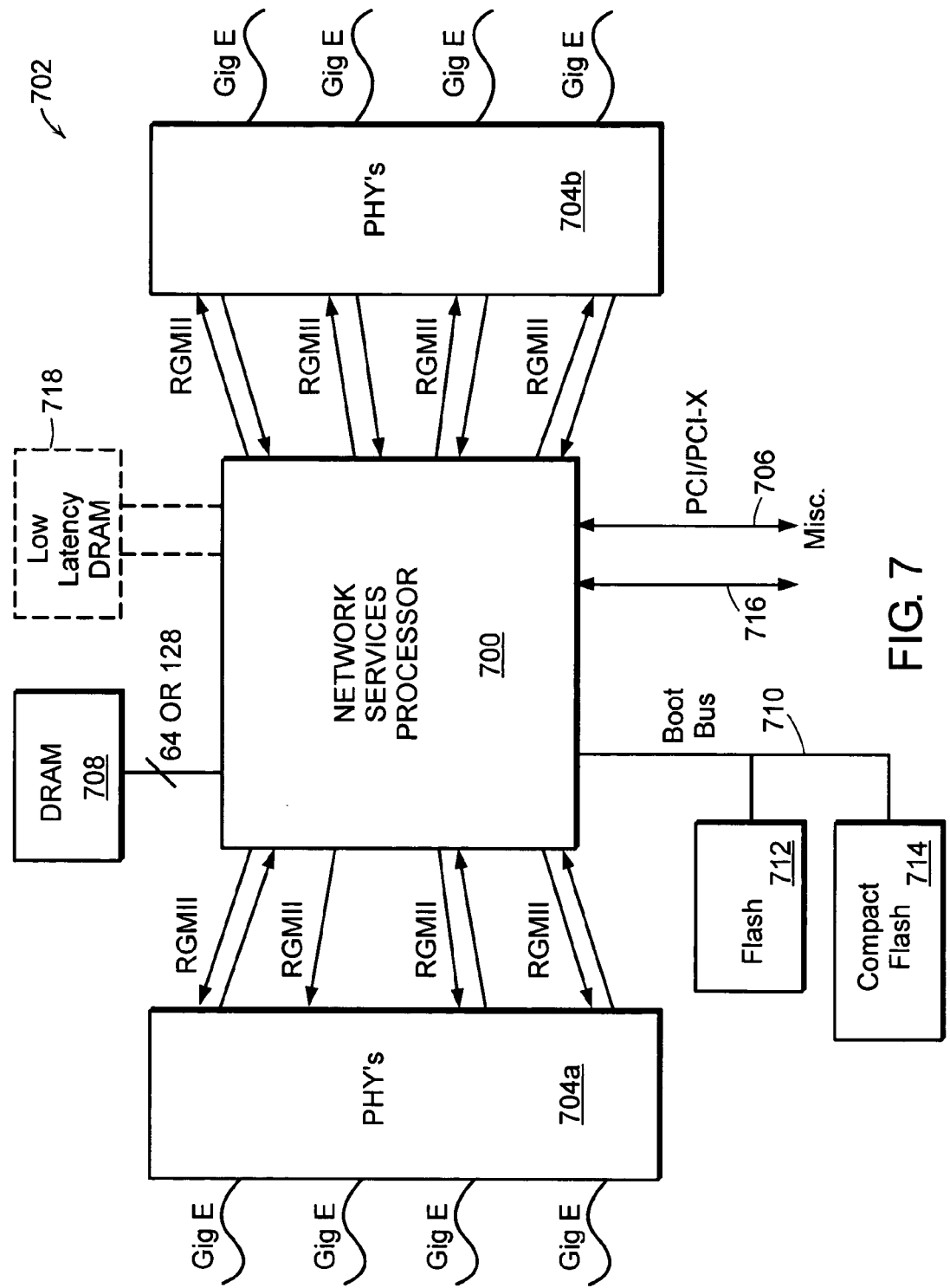
FIG. 7 is a block diagram of a security appliance including a network services processor including at least one RISC processor shown in FIG. 1.

FIG. 7 is a block diagram of a security appliance 702 including a network services processor 700 including at least one processor shown in FIG. 1;

The security appliance 102 is a standalone system that can switch packets received at one Ethernet port (Gig E) to another Ethernet port (Gig E) and perform a plurality of security functions on received packets prior to forwarding the packets. For example, the security appliance 702 can be used to perform security processing on packets received on a Wide Area Network prior to forwarding the processed packets to a Local Area Network.

The network services processor 700 includes hardware packet processing, buffering, work scheduling, ordering, synchronization, and coherence support to accelerate all packet processing tasks. The network services processor 700 processes Open System Interconnection network L2-L7 layer protocols encapsulated in received packets.

The network services processor 700 receives packets from the Ethernet ports (Gig E) through the physical interfaces PHY 704a, 704b, performs L7-L2 network protocol processing on the received packets and forwards processed packets through the physical interfaces 704a, 704b or through the PCI bus 706. The network protocol processing can include processing of network security protocols such as Firewall, Application Firewall, Virtual Private Network (VPN) including IP Security (IPSEC) and/or Secure Sockets Layer (SSL), Intrusion detection System (IDS) and Anti-virus (AV).

A Dynamic Random Access Memory (DRAM) controller in the network services processor 700 controls access to an external DRAM 708 that is coupled to the network services processor 700. The DRAM 708 is external to the network services processor 700. The DRAM 708 stores data packets received from the PHYs interfaces 704a, 704b or the Peripheral Component Interconnect Extended (PCI-X) interface 706 for processing by the network services processor 700.

The network services processor 700 includes another memory controller for controlling Low latency DRAM 718. The low latency DRAM 718 is used for Internet Services and Security applications allowing fast lookups, including the string-matching that may be required for Intrusion Detection System (IDS) or Anti Virus (AV) applications.

Figure 8:
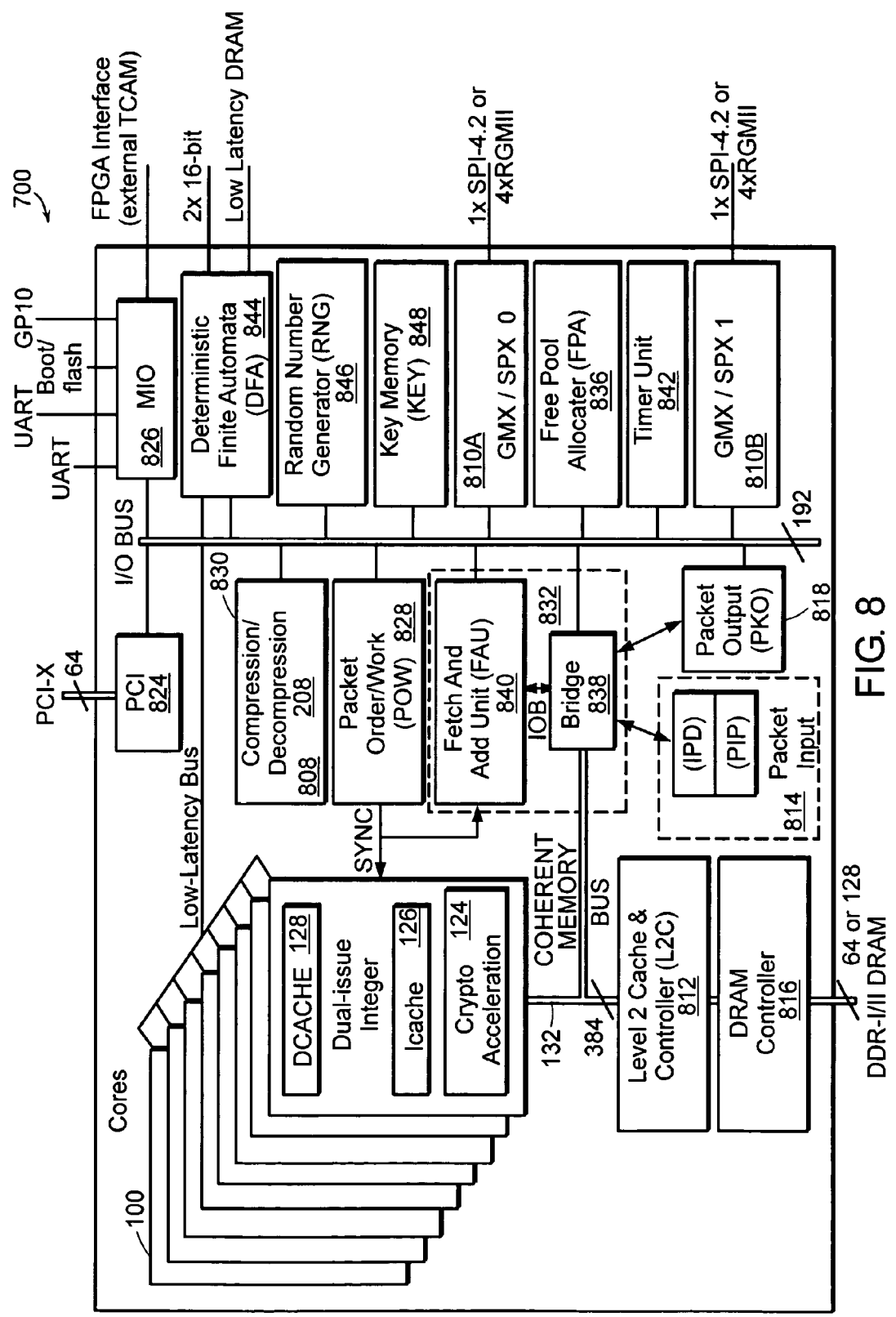
FIG. 8 is a block diagram of the network services processor 700 shown in FIG. 7.

FIG. 8 is a block diagram of the network services processor 700 shown in FIG. 7. The network, services processor 700 delivers high application performance using at least one processor core 100 as described in conjunction with FIG. 1. Network applications can be categorized into data plane and control plane operations. Each of the processor cores 100 can be dedicated to performing data plane or control plane operations. A data plane operation includes packet operations for forwarding packets. A control plane operation includes processing of portions of complex higher level protocols such as Internet Protocol Security (IPSec), Transmission Control Protocol (TCP) and Secure Sockets Layer (SSL). A data plane operation can include processing of other portions of these complex higher level protocols. Each processor core 100 can execute a full operating system, that is, perform control plane processing or run tuned data plane code, that is perform data plane processing. For example, all processor cores can run tuned data plane code, all processor cores can each execute a full operating system or some of the processor cores can execute the operating system with the remaining processor cores running data-plane code.

The SYNCW instruction is typically used in a parallel program which has multiple instruction streams that can execute simultaneously on different processors. The order in which the effects of store instructions are observed by other processors determines the actions necessary to reliably share data in parallel programs.

The effects of store instructions executed by one processor may be observed out of program order by other processors, so parallel programs take explicit actions to reliably share data. At critical points in the program, the effects of stores from an instruction stream must occur in the same order for all processors. The SYNCW instruction allows the effects of all stores prior to the execution of the SYNCW instruction to be seen by all processors before the effects of any store after the SYNCW instruction is executed. The SYNCW instruction allows strict ordering of store instructions when the SYNCW instruction is executed.

The following code fragments in Table 1 illustrate how the SYNCW instruction can be used to co-ordinate the use of shared data between separate writer and reader instruction streams.

TABLE 1

| Writer |
| --- |
| LI R2, 1 |
| SYNCW |
| SW R2, FLAG |
| SYNCW |
| Reader |
| LI R2, 1 |
| 1: LW R1, FLAG |
| BNE R2, R1, 1 |
| NOP |
| LW R1, DATA |

FLAG is used by the instruction streams to determine whether the shared data item DATA is valid. The first SYNCW executed by the writer forces the store of DATA to be performed to external memory before the store to FLAG is performed. The second SYNCW executed by the writer ensures that the store to FLAG does not linger in the write buffer before it becomes visible to other processor cores.

A packet is received for processing by any one of the GMX/SPX units 810a, 810b through an SPI-4.2 or RGM II interface. A packet can also be received by the PCI interface 824. The GMX/SPX unit performs pre-processing of the received packet by checking various fields in the L2 network protocol header included in the received packet and then forwards the packet to the packet input unit 814.

The packet input unit 814 performs further pre-processing of network protocol headers (L3 and L4) included in the received packet. The pre-processing includes checksum checks for Transmission Control Protocol (TCP)/User Datagram Protocol (UDP) (L3 network protocols).

A Free Pool Allocator (FPA) 836 maintains pools of pointers to free memory in level 2 cache memory 812 and DRAM. The input packet processing unit 814 uses one of the pools of pointers to store received packet data in level 2 cache memory or DRAM and another pool of pointers to allocate work queue entries for the processor cores.

The packet input unit 814 then writes packet data into buffers in Level 2 cache 812 or DRAM in a format that is convenient to higher-layer software executed in at least one processor core 100 for further processing of higher level network protocols.

The network services processor 100 also includes application specific co-processors that offload the processor cores 100 so that the network services processor achieves high-throughput. The compression/decompression co-processor 808 is dedicated to performing compression and decompression of received packets. The DFA module 844 includes dedicated DFA engines to accelerate pattern and signature match necessary for anti-virus (AV), Intrusion Detection Systems (IDS) and other content processing applications at up to 4 Gbps.

The I/O Bridge (IOB) 832 manages the overall protocol and arbitration and provides coherent I/O partitioning. The IOB 832 includes a bridge 838 and a Fetch and Add Unit (FAU) 840. Registers in the FAU 840 are used to maintain lengths of the output queues that are used for forwarding processed packets through the packet output unit 818. The bridge 838 includes buffer queues for storing information to be transferred between the I/O bus, coherent memory bus, the packet input unit 814 and the packet output unit 818.

The Packet order/work (POW) module 828 queues and schedules work for the processor cores 100. Work is queued by adding a work queue entry to a queue. For example, a work queue entry is added by the packet input unit 814 for each packet arrival. The timer unit 842 is used to schedule work for the processor cores.

Processor cores 100 request work from the POW module 828. The POW module 828 selects (i.e. schedules) work for a processor core 100 and returns a pointer to the work queue entry that describes the work to the processor core 100.

The processor core 100 includes instruction cache 126, Level 1 data cache 128 and crypto acceleration 124. In one embodiment, the network services processor 100 includes sixteen superscalar RISC (Reduced Instruction Set Computer)-type processor cores. In one embodiment, each superscalar RISC-type processor core is an extension of the MIPS64 version 2 processor core.

Level 2 cache memory 812 and DRAM memory is shared by all of the processor cores 100 and I/O co-processor devices. Each processor core 100 is coupled to the Level 2 cache memory 812 by a coherent memory bus 132. The coherent memory bus 132 is the communication channel for all memory and I/O transactions between the processor cores 100, the I/O Bridge (IOB) 832 and the Level 2 cache and controller 812. In one embodiment, the coherent memory bus 132 is scalable to 16 processor cores, supports fully coherent Level 1 data caches 128 with write through, is highly buffered and can prioritize I/O.

The level 2 cache memory controller 812 maintains memory reference coherence. It returns the latest copy of a block for every fill request, whether the block is stored in the L2 cache, in DRAM or is in-flight. It also stores a duplicate copy of the tags for the data cache 128 in each processor core 100. It compares the addresses of cache block store requests against the data cache tags, and invalidates (both copies) a data cache tag for a processor core 100 whenever a store instruction is from another processor core or from an I/O component via the I/O Bridge 832.

After the packet has been processed by the processor cores 100, a packet output unit (PKO) 818 reads the packet data from memory, performs L4 network protocol post-processing (e.g., generates a TCP/UDP checksum), forwards the packet through the GMX/SPC unit 810a, 810band frees the L2 cache/DRAM used by the packet.

The invention has been described for a processor core that is included in a security appliance. However, the invention is not limited to a processor core in a security appliance. The invention applies to ordering of store instructions in any pipelined processor.

While this invention has been particularly shown and described with references to preferred embodiments thereof, it will be understood by those skilled in the art that various changes in form and details may be made therein without departing from the scope of the invention encompassed by the appended claims.

What is claimed is:

1. A processor comprising:
a write buffer having a plurality of write buffer entries for storing data to be stored in external memory; and
a system interface, the system interface comprising:
a first logic circuit that sends data from write buffer entries to external memory; and
a second logic circuit which upon detecting execution of a store ordering instruction ensures that earlier stores complete before subsequent stores complete, the first and second logic circuits further configured to prevent overflow of an ordering queue and to eliminate stalling of any store ordering instructions at the system interface.

2. The processor of claim 1, wherein the second logic circuit comprises ordering queue logic that ensures that the write buffer addresses are sent by monitoring a commit indicator returned from external memory for each write buffer address.

3. The processor of claim 1, wherein upon detecting active write buffer entries in the write buffer, the system interface allocates an ordering queue entry and identifies the active write buffer entries in the ordering queue entry.

4. The processor of claim 1, wherein upon detecting no active write buffer entries in the write buffer and at least one ordering queue entry in the ordering queue, the system interface sets a store ordering instruction execution indicator in a last ordering queue entry.

5. The processor of claim 1, wherein upon detecting no active write buffer entries in the write buffer and no ordering queue entries in the ordering queue, the system interface allocates an ordering queue entry and sets a store ordering instruction execution indicator in the allocated ordering queue entry.

6. The processor of claim 1 wherein the write buffer has N write buffer entries and the ordering queue has N+1 ordering queue entries.

7. The processor of claim 6, wherein N=16.

8. The processor of claim 1, wherein the write buffer entry includes a buffer for storing data to be stored in external memory and a mask having a bit corresponding to each byte in the buffer.

9. The processor of claim 1, wherein an ordering queue entry includes a store ordering instruction execution indicator and an ordering mask having a bit corresponding to each write buffer entry.

10. A method for ordering store data in a processor comprising:
storing data to be stored in external memory in a write buffer entry in a write buffer;
sending data stored in the write buffer to the external memory; and
upon detecting execution of a store ordering instruction, ensuring that earlier stores complete before subsequent stores complete, preventing overflow of an ordering queue and eliminating stalling of any store ordering instructions at a system interface of the processor.

11. The method of claim 10, wherein ensuring comprises monitoring a commit indicator returned from external memory for each write buffer address.

12. The method of claim 10 further comprising:
upon detecting active write buffer entries in the write buffer, allocating an ordering queue entry in the ordering queue and identifying the active write buffer entries in the ordering queue entry.

13. The method of claim 10 further comprising:
upon detecting no active write buffer entries in the write buffer and at least one ordering queue entry in an ordering queue, setting a store ordering instruction execution indicator in a last ordering queue entry.

14. The method of claim 10 further comprising:
upon detecting no active write buffer entries in the write buffer and no ordering queue entries in the ordering queue, allocating an ordering queue entry and setting a store ordering instruction execution indicator in the allocated ordering queue entry.

15. The method of claim 10, wherein the write buffer entry includes a buffer for storing data to be stored in external memory and a mask having a bit corresponding to each byte in the buffer.

16. The method of claim 10, wherein an ordering queue entry in the ordering queue includes a store ordering instruction execution indicator and an ordering mask having a bit corresponding to each write buffer entry.

17. The method of claim 10, wherein the write buffer has N write buffer entries and the ordering queue has N+1 ordering queue entries.

18. The method of claim 17, wherein N=16.

19. A network services processor comprising:
cache memory; and
at least one processor core, the processor core comprising:
a write buffer having a plurality of write buffer entries for storing data to be stored in the cache memory; and
a system interface, the system interface comprising:
a first logic circuit sending data from write buffer entries to the cache memory; and
a second logic circuit which upon detecting execution of a store ordering instruction ensures that earlier stores complete before subsequent stores complete, the first and second logic circuits further configured to prevent overflow of an ordering queue and eliminating stalling of any store ordering instructions at the system interface.

* * * * *